United States Patent [19]
Mabuchi et al.

[11] 3,947,743
[45] Mar. 30, 1976

[54] ELECTRIC CHARGER

[75] Inventors: Kenichi Mabuchi; Kojiro Komatsu, both of Tokyo; Yoshihisa Tsuchimochi, Ichikawa, all of Japan

[73] Assignee: Mabuchi Motor Co. Ltd., Tokyo, Japan

[22] Filed: Apr. 11, 1974

[21] Appl. No.: 460,070

[30] Foreign Application Priority Data
Apr. 13, 1973 Japan.................... 48-41859

[52] U.S. Cl. .................... 320/2; 320/3; 320/14; 320/38
[51] Int. Cl.² ...................................... H02J 7/00
[58] Field of Search ............... 320/2-5, 35-38, 320/39, 40, 46, 15, 14

[56] References Cited
UNITED STATES PATENTS

| | | | |
|---|---|---|---|
| 2,369,033 | 2/1945 | Eubank | 320/4 |
| 2,701,332 | 2/1955 | Andre | 320/46 |
| 2,780,766 | 2/1957 | Hedding et al. | 320/4 |
| 3,025,455 | 3/1962 | Jonsson | 320/35 X |
| 3,059,185 | 10/1962 | Krugman | 320/3 X |
| 3,305,779 | 2/1967 | Errichiello | 320/4 X |
| 3,414,793 | 12/1968 | Jasperson | 320/2 UX |
| 3,430,059 | 2/1969 | Wolff | 320/2 X |
| 3,603,861 | 9/1971 | Staats et al. | 320/2 X |
| 3,735,232 | 5/1973 | Fister | 320/2 |
| 3,823,367 | 7/1974 | Kaye et al. | 320/2 X |

*Primary Examiner*—R. N. Envall, Jr.
*Assistant Examiner*—Robert J. Hickey

[57] ABSTRACT

There is described a charger and related devices, the charger being capable of charging batteries uniformly to a predetermined level by adjusting the residual electric amounts in the respective batteries to a uniform level prior to the charging operation, thereby avoiding overcharging of a particular battery or batteries. The charger ensures that a number of batteries be charged in a uniform electric amount or up to a predetermined level to preclude inverse charging of an undercharged battery or batteries which occurs when a number of differently charged batteries are used in series.

14 Claims, 29 Drawing Figures

ELECTRIC CHARGER

BACKGROUND OF THE INVENTION

Field of the Invention

This invention generally relates to electric chargers, and more particularly to an electric charger which is adapted to charge batteries after discharging them to a certain uniform level to ensure that the batteries are charged uniformly to a predetermined level in the subsequent charging operation.

Uniform charging of batteries is desirable when charging a number of batteries to prevent overcharging of a particular battery or batteries or to prevent inverse charging which a battery undergoes when connected in series with more highly charged batteries. The instant invention also relates to devices which operate in connection with the charger of the nature mentioned above, including an automatic charge stopping device, a charge supervising device, an external power source, a spare battery compartment and a charging amount adjusting device.

Description of the Prior Art

One of the distinctive recent developments in the art is a compact nickel-cadmium battery which allows accelerated or rapid charging (several minutes or slightly over ten minutes) with a gas releasing valve to release gases which would be generated when overcharged. A battery of this type is advantageous in that it has only a small internal resistance and assures a large discharge current, coupled with the accelerated charging, and therefore has been used widely in various electrical appliances or as a power source for motor-driven models and other movable toys.

Where a nickel-cadmium battery of the type just mentioned is used as a power source for a model plane, it is often desired to preset the charging amount of the battery at a predetermined level to control the flight time of the plane. Furthermore, in charging a number of similar batteries by a single common charger, it is a common experience that a battery having a relatively large residual electric amount is overcharged while a battery having a relatively small residual electric amount is undercharged. When a number of these overcharged and undercharged batteries are used in series, a phenomenon of inverse charging occurs to an undercharged battery or batteries particularly where there are irregularities in the electric characteristics of the respective batteries, due to accelerated discharging of a particular battery or batteries prior to other batteries. This phenomenon should be avoided since it often results in failures of the batteries in supplying sufficient power and also in deterioration in quality and reduction of the service life of the batteries. The aforementioned phenomenon occurs to an increased degree especially where the batteries are charged or discharged with a larger current as compared with their capacity.

For example, for application to an expensive remote control miniature model or toy or to a relatively expensive electrical appliance or machine, it is the usual practice to employ batteries which have been produced in one and the same lot and which have been found after inspection to have uniform electric characteristics, connecting a plural number of same batteries in series by spot welding or the like to provide a packaged battery of a cassette type. However, for an economical reason or for some other reason, there may arise the necessity of using in an electrical appliance a number of batteries which are of the same type but which have been to be used under different conditions. In such a case an operator or user of the electrical appliance often finds certain batteries overcharged or inversely charged as mentioned hereinbefore.

The present invention aims at removing the aforementioned problems and contemplates to solve them by discharging batteries to a predetermined level prior to the charging operation so that the respective batteries have a uniform or predetermined amount of residual electricity upon initiation of the charging operation.

SUMMARY OF THE INVENTION

It is an object of the present invention to provide a charger which is adapted to discharge batteries to a predetermined level prior to a charging operation for charging the batteries uniformly to the same extent in the subsequent charging operation.

It is another object of the present invention to provide a charger which is adapted to eject a charged battery or batteries upon termination of a charging time by cooperative action of a timer and a casing or housing of the battery.

It is a further object of the present invention to provide a charger having a charging circuit which is adapted to be completed by closing a lid of a housing or casing of the charger.

It is a still further object of the present invention to provide a charger having means for stabilizing the charging current during the battery charging operation.

It is a further object of the present invention to provide a charger which includes means for allowing a battery to pop up automatically pushing a lid of the charger housing open upon completion of charging.

It is still another object of the present invention to provide a charger including an automatic charge stopping device with a particular terminal construction to prevent completion of the charging circuit when a battery is placed upside down in the charger.

A further object of the present invention is to provide a compatible charger which allows charging from either an internal power source in the form of a battery or an external power source.

Still another object of the present invention is to provide a charging circuit device which can handle batteries of different charging currents with use of a single power source and a single charging voltage supervising device.

A further object of the present invention is to provide a charger including a compartment for accommodating a spare battery or batteries.

It is another object of the present invention to provide a charger including a compartment for accommodating a spare battery and adapted to eject the spare battery automatically when a lid of the compartment is opened.

It is still another object of the present invention to provide a charger which is adapted to maintain the charging electric amount constant even if the power source battery undergoes a voltage drop.

It is a further object of the present invention to provide a charger employing a non-linear resistor element for the stabilization of the charging current.

BRIEF DESCRIPTION OF THE DRAWINGS

The above and other objects, features and advantages of the present invention will become clear from the following description and the appended claims, taken in conjunction with the accompanying drawings which show by way of example preferred embodiments of the present invention, wherein like numerals are used to designate like parts and in which:

DETAILED DESCRIPTION OF THE INVENTION

Figure 1:
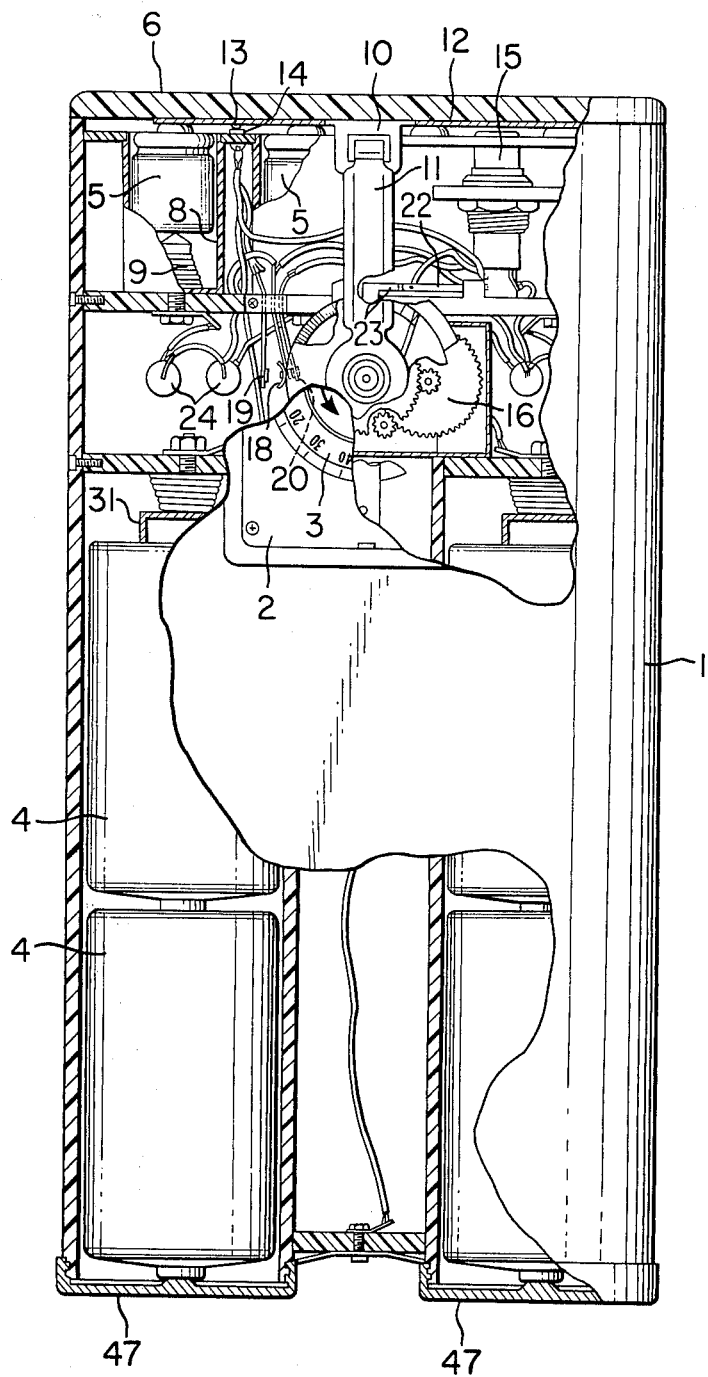
FIG. 1 is a front view partially in section showing the general construction of an electric charger according to the present invention, the charger having incorporated therein a discharger.

Referring to the accompanying drawings and first to FIG. 1, the charger according to the present invention includes a casing or housing 1, a cover plate 2 for a timer which will be discussed in detail hereinafter, a dial 3 of the timer, an internal power source in the form of a battery 4 for charging exhaust batteries 5 and a lid 6 hinged to an open upper end of the casing 1, the lid 6 forming charging and discharging circuits for the exhaust batteries 5.

Figure 2:
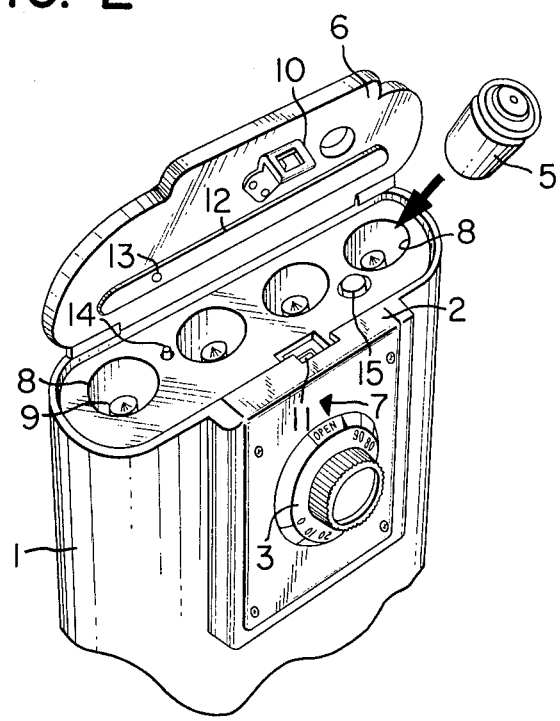
FIG. 2 is a perspective view of the charger with a dial means and pockets for receiving individually a number of batteries.

When an "OPEN" mark on the dial 3 is in a position below a reference mark 7 on the cover plate 2 as shown in FIG. 2, the lid 6 may be freely turned up or down to open or close the upper end of the casing. In this position, exhausted or partially exhausted batteries 5 are put into pockets 8 in the casing 1 against the action of a spring 9 and then, after closing the lid 6 on the casing 1, the timer is actuated by turning the dial 3 counterclockwise. Upon setting the dial 3, a spring hook 11 on the side of the casing 1 is brought into locking engagement with a fixed locking member 10 on the lid 6 as will be described hereinlater with reference to FIG. 4 and other succeeding figures. After closing the lid 6, if a starting button switch (not shown) is depressed, a timer motor is started and, as the charging operation proceeds automatically, the dial 3 is rotated counterclockwise by means of a timer mechanism. As soon as the "OPEN" mark on the dial returns to a position corresponding to or under the reference mark 7 on tee cover plate 2, the spring hook 11 on the casing 1 is released from the locking engagement with the locking member 10 on the lid 6 as will be described hereinlater and a charged battery 5 is ejected upon opening the lid 6 by the restoring action of the spring 9. The lid 6 is provided on the inner surface thereof with a connector 12 in the form of an elongated flat plate. The connector 12 is provided with a contact projection 13 for engagement with a contact 14 on the side of the casing 1 when the lid 6 is closed thereon. There is indicated at 15 a pilot lamp which serves to stabilize the charging current during the charging operation of the exhausted battery 5, and at 16 (FIG. 1) a timer mechanism which is mounted on the front side of the casing 1.

Figure 3:
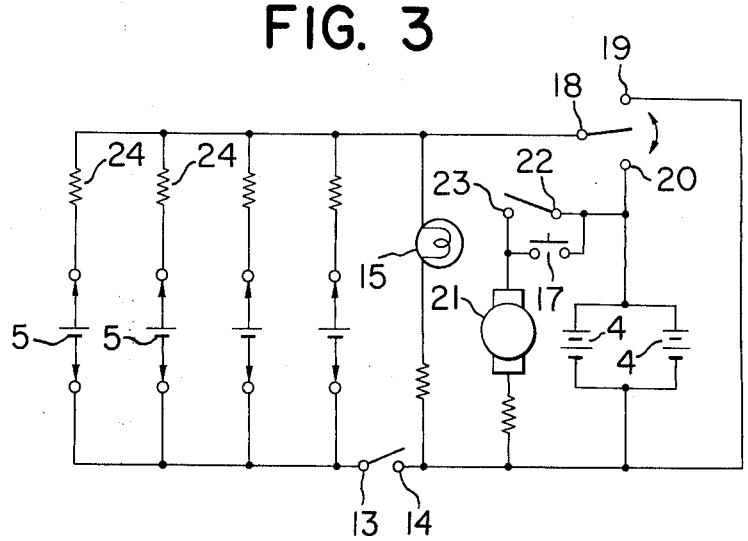
FIG. 3 is an electric circuit diagram of a charger having a discharger incorporated therein.

With reference to FIG. 3 showing an electric circuit diagram of the charger having incorporated thereinto a discharger according to the present invention, when the lid 6 is closed and the dial 3 is turned counterclockwise into an operative position, a change-over switch 18 is closed on a contact 19 as will be described hereinlater, and upon depressing a starting button switch 17, a timer motor 21 is started. By the rotation of the timer motor 21, a cam mechanism is actuated and closes retaining contacts 22 and 23. The timer motor 21 continues its rotation until the retaining contacts 22 and 23 are opened by the cam mechanism.

For a predetermined time period after the start of the time motor 21 mentioned above, the cam mechanism retains the changeover switch 18 on the contact 19 on the discharge side and the respective exhausted batteries are discharged through a resistor 24 by way of contacts 13 and 14 and contacts 18 and 19. In this instance, the time period for the predischarge is determined such that the amounts of residual electric amounts in the respective exhaust batteries become uniform at the end of the predischarging operation (of course, with nickel-cadmium batteries, the discharge may be continued until the terminal voltages of the respective batteries become zero).

Upon completion of the predischarging operation, the changeover switch 18 is thrown onto the contact 20 on the side of the power source by means of the cam mechanism and retains the same position until the movable contact 18 is switched again by the cam mechanism. In the meantime, the exhausted battery 5 is charged continuedly and the timer motor 21 is kept in rotation until the termination of a preselected charging time. Upon completion of the charging, the lid 6 is thrown open to eject the charged battery 5 by releasing the spring hook 11 which has been held in locking engagement with the fixed locking member 10 on the side of the lid 6 in the manner described hereinbefore with reference to FIG. 2. Thereafter, the timer motor 21 continues its rotation until the retaining contacts 22 and 23 are opened by the cam mechanism.

Figure 4A:
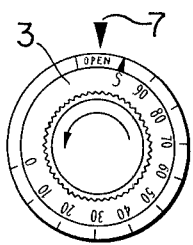
FIGS. 4A through 4D FIGS. 5A through 5D and FIGS. 6a through 6D are views explanatory of the procedures for a full-charging operation.
Figure 4B:
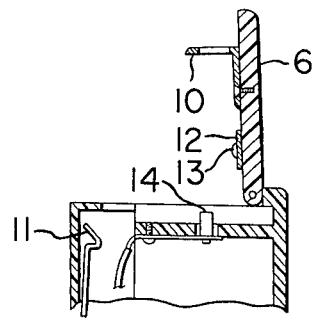
Figure 4C:
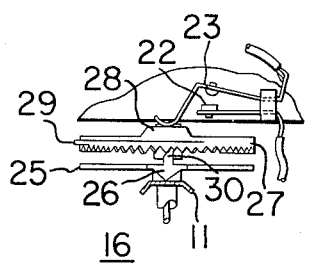
Figure 4D:
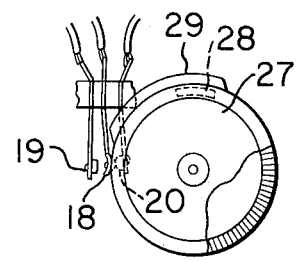

The mechanisms for the discharging and charging operations will now be described with reference to FIGS. 4A to 4D and FIGS. 7A to 7D. FIGS. 4A to 4D show various component parts in positions before loading the exhausted batteries (FIGS. 1 to 3), respectively, and wherein;

1. The "OPEN" mark of the dial 3 is in a position below the reference mark 7 on the cover plate 2 (FIG. 4A);
2. The timer mechanism 16 is provided with a sliding plate 25 which is rotatable counterclockwise upon setting the dial 3 by a driving force from the timer motor 21 and which is adapted to press the spring hook 11 to keep the same from locking engagement with the fixed locking member 10 on the lid 6 (FIGS. 4B and 4C);
3. The timer mechanism 16 is provided with a cam mechanism 27 which is driven to rotate counterclockwise from the timer motor 21 and which, before loading the exhausted batteries, assumes the position shown, holding the retaining contacts 22 and 23 open by means of a cam member 28 (FIG. 4C); and
4. The cam mechanism 27 is provided with a switching cam member 29 for holding the change-over contact 18 in engagement with the contact 20 on the side of the source battery (FIG. 4D).

Figure 5A:
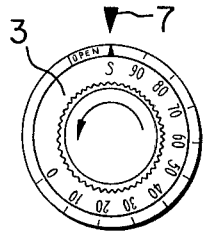
Figure 5B:
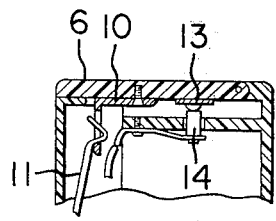
Figure 5C:
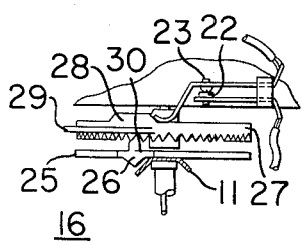
Figure 5D:
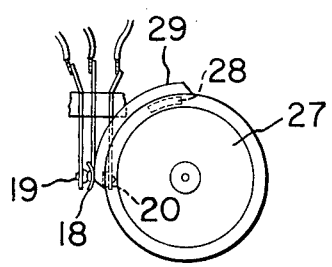

In the position just mentioned, an exhausted battery 5 is put into a pocket 8 of the charger and then the lid 6 is closed. In order to attain full charging of the battery 5, the dial 3 is turned to bring the mark "S" on the dial 3 into registry with the reference mark 7 on the cover plate 2 on the casing 1 and a starting button switch (FIG. 3) is depressed to start the timer motor (FIG. 3), whereupon the cam mechanism 27 starts to rotate counterclockwise as shown in FIGS. 5A to 5D. That is to say, FIGS. 5A to 5D show the related movable component parts in the positions at the initial stage of the discharging operation, and wherein:

1. When full charging is desired, the dial 3 is held in the position shown with the mark "S" of the dial in a position immediately below the reference mark 7 on the cover plate 2 (FIG. 5A);
2. The sliding plate 25 is rotated slightly counterclockwise with the claw 26 disengaged from the spring hook 11 to allow its locking engagement with the fixed locking member 10 on the lid 6 (FIGS. 5B and 5C);
3. The lid 6 is closed and the contacts 13 and 14 are also closed to prepare the discharging circuit for the preliminary discharging operation (FIG. 5B);
4. The retaining contacts 22 and 23 are closed by means of an on-off cam member 28 of the cam mechanism 27, placing the timer motor 21 in a self-retaining state (FIG. 5c); and
5. The change-over contact 18 is thrown to the contact 19 on the discharging side by means of a switching cam member 29 of the cam mechanism 27 to complete the discharging circuit (FIG. 5D).

Figure 6A:
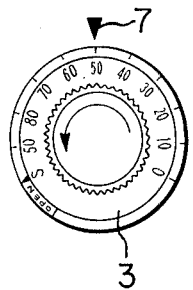
Figure 6B:
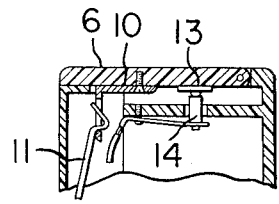
Figure 6C:
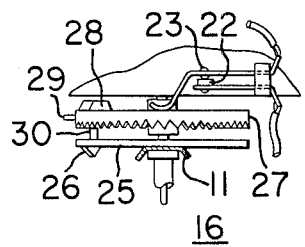
Figure 6D:
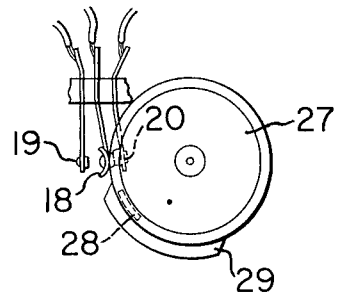

Thus, the respective exhausted batteries 5 are discharged simultaneously through resistor 24, contacts 18 and 19 and contacts 13 and 14. In the meantime, the timer motor 21 continues its rotation through the retaining contacts 22 and 23 to rotate the cam mechanism 27 counterclockwise, causing the sliding plate 25 of the dial 3 to rotate counterclockwise by means of a click stop claw 30 of the sliding plate 25. FIGS. 6A to 6D show positions of movable component parts after completion of the discharging operation under conditions shown in FIGS. 5A to 5D. In FIGS. 6A to 6D:

1. The dial 3 has been rotated with respect to the reference mark 7 with the "S" mark displaced by, for example, 50 graduations from the reference mark 7 (FIG. 6A);
2. The claw 26 of the sliding plate 25 is held clear of the spring hook 11 with the lid 6 in the locked state (FIGS. 6B and 6C);
3. The lid 6 and contacts 13 and 14 are still held in the closed state; however, the discharging circuit is held in an inoperative state for the reason that will be described hereinlater (due to switching of the change-over contact 18) (FIGS. 6B and 6D);
4. The retaining contacts 22 and 23 are held in the closed state by means of the on-off cam member 28 of the cam mechanism 27, still keeping the timer motor 21 in rotation (FIG. 6c); and
5. The change-over contact 18 is closed on the contact 20 on the side of the source battery by means of the switching cam member 29 of the cam mechanism 27 (FIG. 6D).

Thus, charging of the respective exhausted batteries 5 is started through the charging circuit leading from the source battery 4 through the contacts 18 and 20 and resistor 24 to the exhausted batteries 5 as clearly shown in FIG. 3. The initiation of the charging operation is controlled by the switching cam member 27 of the cam mechanism such that there is always a sufficient time allowance for completely discharging the respective batteries to a predetermined level before commencing the required charging. As the charging operation proceeds, the dial 3 is rotated counterclockwise until the lefthand end of the "OPEN" mark on the dial 3 comes to a position below the reference mark 7. In case of a full charging operation, the respective moving parts are returned to the initial positions shown in FIGS. 4A to 4D at this time point, the claw 26 of the sliding plate 25 pressing down the spring hook 11 out of the locking engagement with the fixed locking member 10 on the lid 6. Upon unlocking the spring hook 11, the charged batteries 5 are ejected from the pockets 8 in the casing 1 (FIGS. 1 and 2) by the action of the compression springs each provided at the bottom of the respective pockets 8, throwing open the lid 6.

In order to effect a partial charging, the dial 3 is turned to bring a graduation representative of a desired extent of charging on the scale of the dial 3, for example, a graduation "60" is brought into the position immediately below the reference mark 7 instead of the "S" mark and then the starting button switch is depressed. The positions assumed by the respective moving component parts upon completion of the partial charging subsequent to the predischarging operation are shown in FIGS. 7A to 7D.

The partial charging operation will now be described in greater detail with reference to the drawings. In the initial stage of the preliminary discharging operation preparatory of the partial charging, the respective movable components are in the same positions as shown in FIGS. 5A to 5D except that a graduation of a desired charging degree (e.g. 60) on the scale of the dial 3 is brought into the position below the reference mark 7 instead of the "S" mark. Even if the dial 3 is turned counterclockwise and set in a position of the desired graduation, the rotational movement of the dial 3 is followed only by the sliding plate 25 and the cam mechanism 27 is stopped against rotation by means of the click stop claw 30. The graduation "60" on the scale of the dial 3 is turned counterclockwise with respect to the reference mark 7 by means of the timer motor 21 of the cam mechanism 27. When a graduation "10" on the dial 3 comes to a position immediately below the reference mark 7 on the cover plate 2 on the casing 1, the charger is placed under the same conditions as in FIGS. 6A to 6D except for the position of the dial 3 with respect to the reference mark 7, wherein the change-over contact 18 is switched to the contact 20 on the side of the power source by means of the switching cam member 29 of the cam mechanism 27. That is to say, even in the case of a partial charging operation, the predischarge is effected for a time period corresponding to "50" graduations on the scale of the dial 3.

Figure 7A:
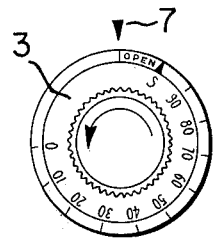
FIGS. 7A through 7D are views showing the positions of moving parts after completion of a short-time charging operation.
Figure 7B:
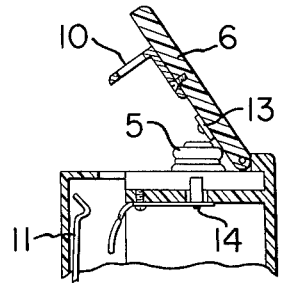
Figure 7C:
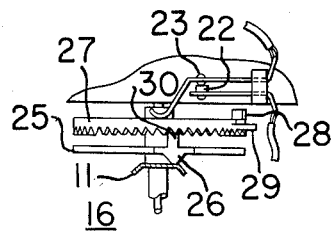
Figure 7D:
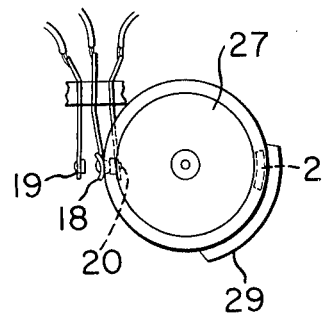

The dial 3, after the graduation "10" registering a position below the reference mark 7, continues its counterclockwise rotation for the whole time period of the charging operation, and when the lefthand end of the "OPEN" mark on the dial comes to the position below the reference mark 7, as shown in FIGS. 7A to 7D, the spring hook 11 is pressed by the claw 26 of the sliding plate 25 and the charged batteries 5 are simultaneously ejected out of the respective pockets in the casing, throwing open the lid 6 to complete the whole operation. Under these circumstances:

1. The lefthand end of the "OPEN" mark on the dial 3 is in the position immediately below the reference mark 7 (FIG. 7A);
2. The claw 26 of the sliding plate 25 is pressing the spring hook 11 to hold the lid 6 in an unlocked state (FIGS. 7B and 7C);
3. The lid 6 is open and the contacts 13 and 14 are disengaged from each other (FIG. 7B);
4. The retaining contacts 22 and 23 are held in a closed state by means of the on-off cam member 28 of the cam mechanism 27 and the timer motor 21 is kept in rotation (FIG. 7C); and
5. The change-over contact 18 is held in engagement with the contact 20 on the side of the power source by means of the switching cam member 29 of the cam mechanism 27 (FIG. 7D).

It will be appreciated from the foregoing description that the timer motor 21 further continues its rotation from the position shown in FIG. 7 to rotate the cam mechanism 27 counterclockwise. However, in this instance, the spring hook 11 is pressed by the claw 26 of the sliding plate 25, so that, even if the click stop claw 30 should tend to rotate the sliding plate 25 with the rotation of the cam mechanism 27, the sliding plate 25 escapes the driving force due to the resiliency of the click stop claw 26 and does not rotate with the dial 3. Conversely speaking, the click stop claw 26 is designed to this effect. Therefore, the cam mechanism 27 solely keeps rotation with the timer motor 21 until the cam mechanism 27 comes to the position shown in FIG. 4D, whereupon the retaining contacts 22 and 23 are opened by the on-off cam member 28 of the cam mechanism 27 and the timer motor 21 comes to a stop. That is to say, the respective operating parts of the charger are returned to their initial positions.

It will be understood from the foregoing description, that, according to the present invention, in either the full charging or partial charging operation, the preliminary discharge of the batteries is effected for a predetermined time period prior to the charging operation, to bring the residual electric amounts in the respective batteries to a certain uniform level to prevent overcharging from occurring to any one of the batteries to be charged. Therefore, there will be no possibility of the batteries being discharged prematurely during use due to undercharging, thus precluding inverse charging of an underdischarged battery during use.

Furthermore, it is possible to charge either only one battery or simultaneously a number of batteries by placing them in the desired pockets of the charger in the predetermined position. The connector 12 which is provided on the inner surface of the lid 6 has a flat form so that even if a battery 5 is placed in the pocket 8 in an inverted state, the connector 12 only contacts an insulative cover on the battery 5 without allowing conduction through the negative terminal of the battery. Therefore, when the battery 5 is placed upside down, the pilot lamp 15 is not lit nor the battery 5 is discharged or charged.

Also even if the source battery 4 is mounted in a wrong inverted position on the charger, contact of a negative terminal connecting member 31 with the positive terminal of the battery 4 is prevented since the connecting member 31 for the negative terminal of the battery is provided in a recessed or hollow cylindrical form.

Furthermore, the click stop claw 26 of the sliding plate 25 is imparted with suitable resiliency to yield to a driving force as will be applied from the side of the cam mechanism 27 when the sliding plate 25 is in the stop position as mentioned above, so that there will occur no breakage or trouble even if the dial 3 is turned in a reverse direction.

Moreover, with the charger construction according to the present invention, when the spring 11 is driven from a timer mechanism or other means to disengage from the locking member 10 on the lid 6, the battery 5 is ejected automatically by the action of the compression spring 9, throwing the lid 6 open, to facilitate the removal of the battery from the charger and open the charging circuit. The automatic ejection of the charged battery or batteries gives notice of the termination of the charging operation to the operator and contributes to eliminating the battery removal efforts which will otherwise be required. The charging operation can be started simply by closing the lid 6.

Figure 8:
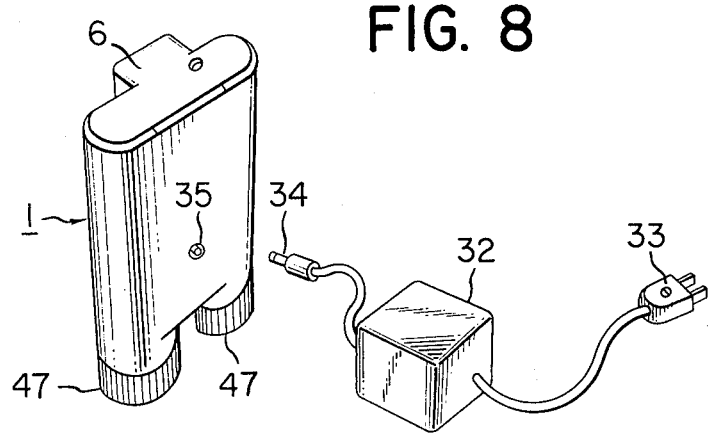
FIG. 8 is a perspective view showing the manner for a charging operation with use of an external power source.
Figure 9:
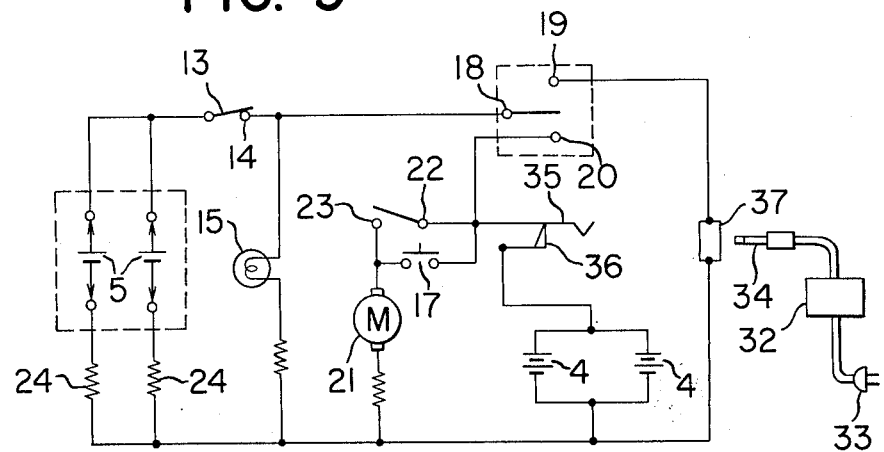
FIG. 9 is an electric circuit diagram for a charging operation with use of an external power source as shown in FIG. 8.

FIGS. 8 and 9 show another embodiment of the present invention, wherein the charger is operated by an external power source. In order to perform the charging operation by means of an external power source, without using an internal source battery mounted within the casing of the charger as in the preceeding embodiment, a jack 34 of a connector 32 having another plug 33 at an opposite end for connection to an external power source is inserted into a receptacle 35 on the charger body. When the jack 34 is inserted into the receptacle containing the jack contact member 35, the fore end portion of the jack 34 pushes up and electrically contacts the jack contact member 35, thereby opening a normally closed contact 36. On the other hand, base portions of the jack 34 are brought into contact electrically with a grounding member 37, thus connecting the external power source in an operative condition instead of the internal source batteries 4. The operations with the external power source are the same as with the internal source batteries 4 and are not reiterated herein for simplicity of explanation. Needless to say, the external power source voltage is maintained at a predetermined level by means of the connector 32.

Since the charger of the present invention is built in a compact and portable construction which allows use of both internal and external power sources, the charger may be utilized conveniently in various places no matter whether there is or there is not an access to an external power source. Charging with use of an external power source is advantageous from an economical point of view particularly when the charger is used for the rapidly chargeable type nickel-cadmium batteries which are usually mounted on motor-driven amusement cars or carts or other indoor amusement devices.

Figure 10:
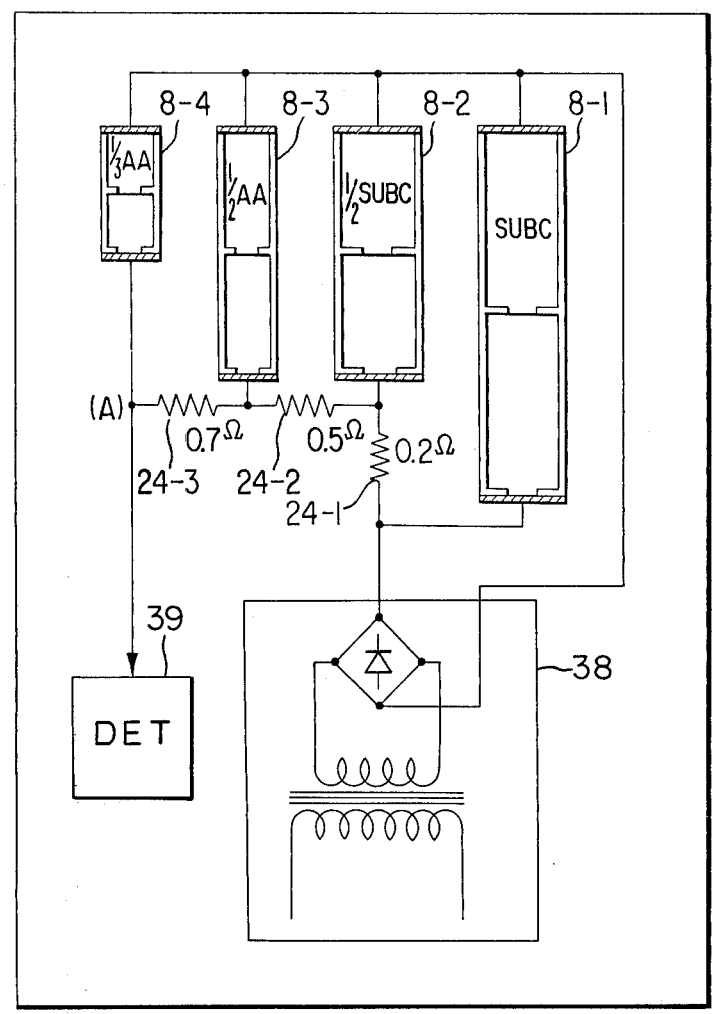
FIG. 10 is a block and circuit diagram of a charger incorporating within a single body a power source, a voltage supervising means and a number of pockets for a variety of batteries.

FIG. 10 shows an embodiment employing a single and common voltage supervising means for controlling a number of nickel-cadmium batteries of different charging currents. The existing industrially standardized batteries are classified into several types depending upon the capacity of the batteries, including an SUBC type, ½SUBC type, ½AA type and ⅓AA type having charging currents of 4A, 3A, 2A and 1A, respectively.

Referring to FIG. 10, a power source 38 is shown as a means for rectifying alternate current for simplicity of illustration. The reference numeral 39 indicates a voltage supervising means which is, for example, in the form of an electronic circuit of a high input resistance, and 8-1 to 8-4 designate charging pockets for receiving two SUBC type batteries, two ½SUBC type batteries, two ½AA type batteries and two ⅓AA type batteries, respectively. There are shown at 24-1 to 24-3 charging current correcting resistors. In this instance, the charging pockets 8-1 to 8-4 are respectively designed to receive one or a couple of the same type batteries. Batteries of different types should not be placed in one and same charging pocket, and the charging operations are carried out type by type of the batteries to be charged that is, one charging operation is directed to one battery or two of the same type. A predetermined charging current is fed respectively to the particular type of battery to be charged, that is to say, to the SUBC type by means of the internal resistance of the power source 38, to the ½SUBC type by means of series connection of the internal resistance of the power source 38 and the resistance 24-1, to the ½AA type by means of a series connection of the internal resistance of the power source 38 and resistances 24-1 and 24-2, and to the ⅓AA type by means of a series connection of the internal resistance of the power source 38 and resistances 24-1, 24-2 and 24-3.

The charge supervising means 39 is connected to the pocket 8-4 for the batteries of the smallest charging current and it will be clear from the illustration of FIG. 10 that it is capable of directly detecting the charging current to the battery or batteries of the ⅓AA type.

When charging a battery of the ½AA type, resistance 24-3 is connected in series between the terminal of the battery and the charging voltage supervising means 39. In this instance, however, a ⅓AA type battery is not mounted simultaneously with the ½AA type, so that there is no appreciable voltage drop due to resistance 24-3 and thus the charging voltage supervising means 39 can correctly detect the charging current to the ½AA type battery. In a similar manner, when charging a ½SUBC type battery or an SUBC type battery, a voltage drop due to the presence of the resistances 24-2 and 24-3 or resistances 24-1, 24-2 and 24-3 is only of an ignorable degree.

The circuit arrangement incorporating a single power source and a single voltage supervising means has another advantage in that the charging voltages may be detected correctly without necessitating provision for a charging current correcting resistance, making it possible to produce at a low cost a charging circuit device which is compatible with a variety of different types of batteries. It will be understood that a resistance may be inserted between the point (A) and the voltage supervising means 39 in the circuit diagram shown in FIG. 10.

Referring now to FIGS. 11 to 14, which show another embodiment of the invention, the charger is provided with a compartment for storing in a safe state a small-sized charged battery or batteries, which would otherwise be inadvertently short-circuited, in such as a cloth-insulated pocket when carried together with the charger.

Figure 11:
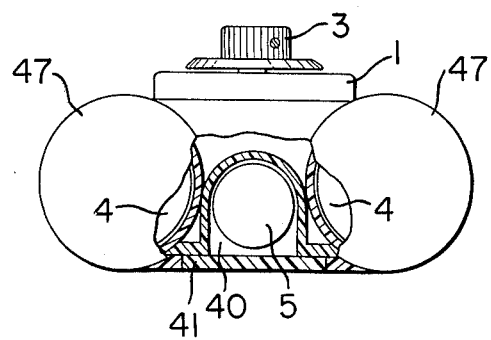
FIG. 11 is a plan view partially in section of an embodiment having a space for storing a small-sized spare battery.
Figure 12:
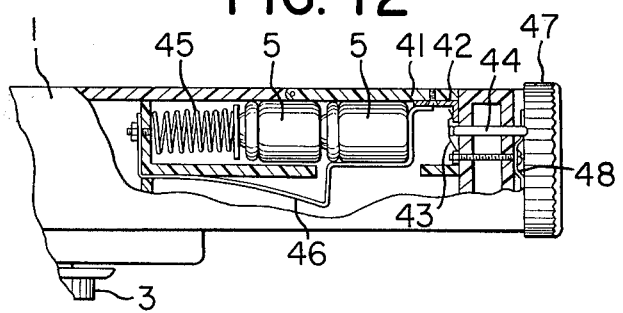
FIGS. 12 through 14 are fragmentary plan views partially in section showing the procedures for inserting or removing a spare battery into or from the storing space in the charger of the invention.
Figure 13:
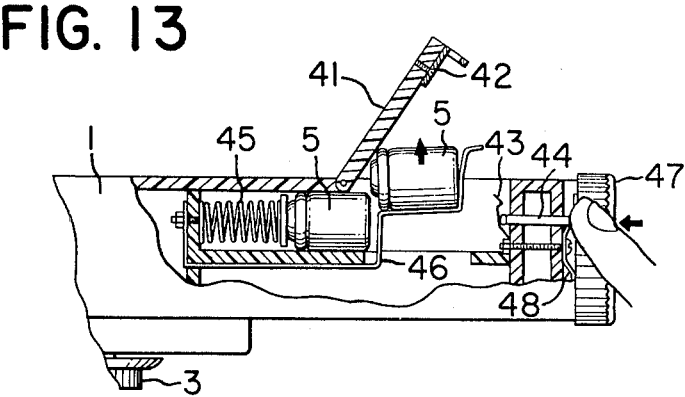
Figure 14:
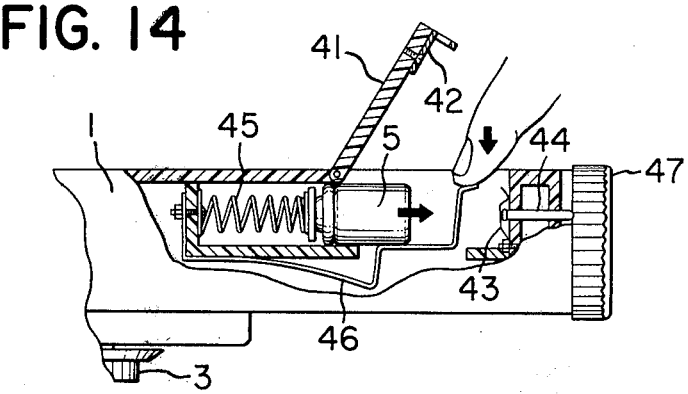

In FIG. 11, the charger is formed with a compartment 40 for storing small-sized spare batteries. The spare battery is inserted into and removed from the compartment in the manner as shown in FIGS. 12 to 14.

Charged batteries 5 are stored in a compartment 40 which is provided by the utilization of the space which is normally used for mounting source batteries 4. As shown in FIGS. 12 to 14, the compartment 40 has a lid 41 which is provided with a fixed locking member 42 for engagement with hooked leaf spring 43 on the body of the charger when the lid 41 is closed. In order to open the lid 41, an opening button 44 is depressed in the manner shown to release the leaf spring 43 from the locking engagement with the fixed locking member 42 on the lid 41. Upon opening the lid 41, the stored battery 5 is ejected from the compartment by the action of a spring as will be described in greater detail hereinafter.

For ejecting a charged battery or batteries 5, storing compartment 40 has mounted therein a compression spring 45 which is secured at one end to an end wall of the compartment together with an angularly shaped leaf spring 46 which defines the other end of the compartment 40. As seen from in FIG. 13, upon opening the lid 41, the battery immediately below the lid 41 is floatingly raised above the plane of the lid 41 by the restoring action of the angular leaf spring 46. However, when the lid 41 is closed, the resilient member or angular leaf spring 46 yields into an arcuately compressed state as shown particularly in FIG. 12. Therefore, if the lid opening button 44 is depressed to release the spring hook 43 from the locking engagement with the fixed locking member 42 of the lid 41, the angular spring member 46 which has been held in an arcuately compressed state tends to restore its non-biased state, throwing the lid 41 open and pushing the forwardly positioned one of the batteries 5 out of the compartment 40. Upon removing the forwardly positioned battery 5, the other battery which has been accommodated in the deeper portion of the compartment 40 may be urged toward the forward position beneath the opening of the lid 41 by the action of the coil spring 45 simply by pressing down a tab at the head of the angular leaf spring 46 as shown in FIG. 14. By releasing the tab at the head of the angular leaf spring 46, the forwardly displaced battery 5 may also be projected out of the compartment 40 in the same manner by the restoring action of the leaf spring 46.

The reference numeral 47 shows a metal cap for covering the space for accommodating the source battery 4 on the charger and 48 indicates a connector member which serves to electrically connect the cap members 47.

The provision of the compartment 40 on the charger for accommodating charged batteries 5 can contribute to increase the convenience of the charger particularly when the charger is used for small-sized batteries which are repeatedly put in service (discharge) at an increased frequency. Furthermore, according to the embodiment of the invention just described, the charged batteries in the storing compartment may be taken out by the simplest operation, i.e., simply by depressing the lid opening button 44.

Figure 15:
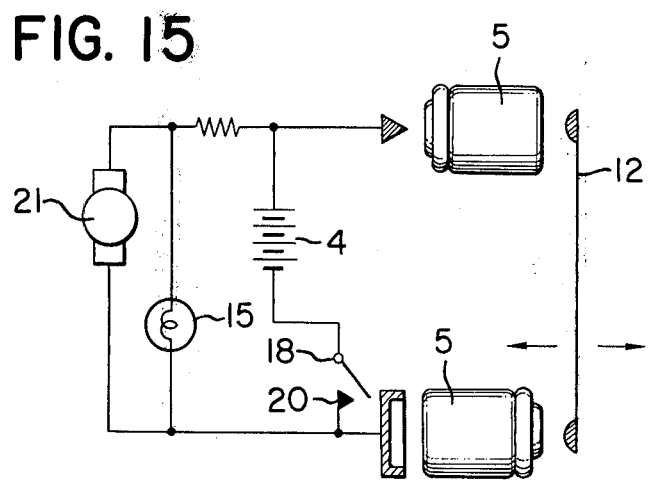
FIG. 15 is an electric circuit diagram of a charger of the invention.

FIG. 15 shows another embodiment of the invention which is provided with means for preventing variations in the amount of electricity to be charged, which might be caused due to a voltage drop of the power source or the source battery as a result of repeated charging operations. In this connection, reference is had to FIG. 16 which shows a time-voltage characteristic curve as obtained with use of a mechanical timer (e.g., spring type) which allows no charging time adjustments. Similarly, FIG. 17 shows a time-voltage characteristic curve as obtained with use of a motor-driven timer as in the present invention.

Referring to FIG. 15, after placing the exhausted batteries 5 in position in the pockets on the charger, the charging circuit for the thus placed batteries 5 is completed by closing the lid 6. For simplicity of illustration, the batteries 5 are shown as being charged from source batteries 4 through switch contacts 18 and 20. For the purpose of driving a timer (not shown) which is adapted to measure the charging time, a DC motor 21 is employed instead of a spring drive. The DC motor 21 is adapted to be driven from the source batteries 4 as well as from a non-linear resistor element such as a pilot lamp 15. When the timer has been driven from the motor 21 to the position preset by way of the indicator portion of the timer, the lid 6 is opened automatically and the connector 12 automatically breaks the charging circuit.

Figure 16:
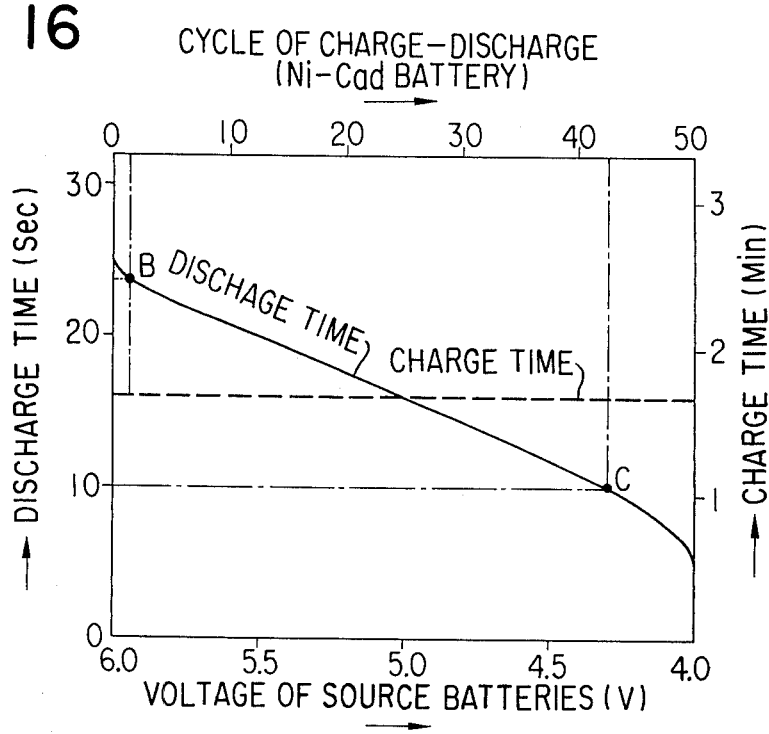
FIG. 16 is a graphical illustration showing a time-voltage characteristic curve obtained with use of a spring type timer.
Figure 17:
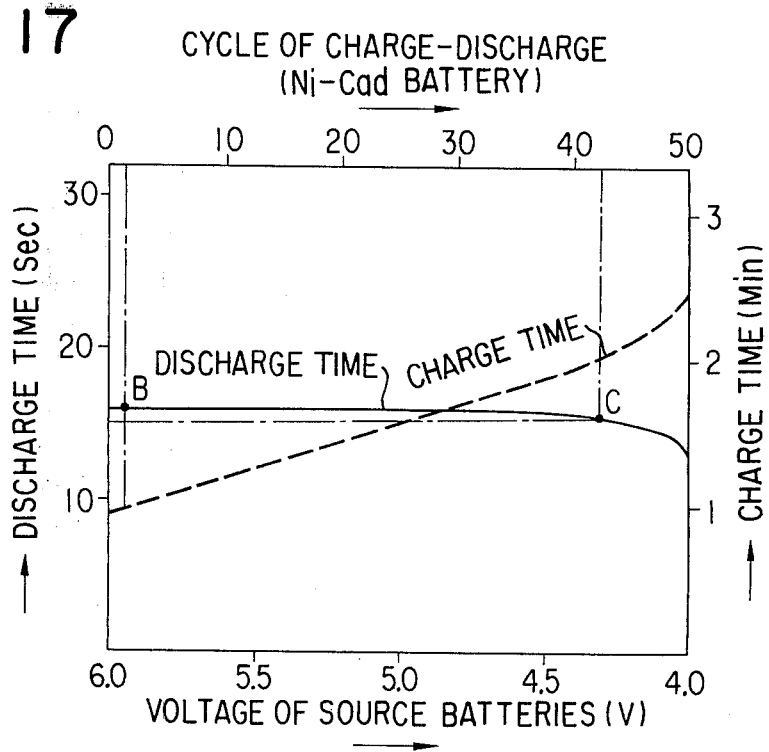
FIG. 17 is a graphical illustratoon showing a time-voltage characteristic curve obtained with use of a motor-driven timer.

In FIGS. 16 and 17, the abscissas represent both the cycle of charge-discharge operations for small-sized batteries by means of the charger of the invention using as a power source four manganese UM - 1 type batteries and the voltage of the source batteries resulting from the repeated charging operations, which the ordinates represent both the discharging time duration of the charged small-sized batteries at about 4.0 amperes and the charging time required for ensuring the discharging time with use of manganese UM - 1 type batteries.

More particularly, in the charging operation with use of a spring-actuated timer as in FIG. 16, if the same charging time is preset by way of the indicator portion or dial of the timer, the charging time remains the same even when the charging operation is effected at an increased frequency or even when a voltage drop occurs in the source batteries, since the spring-actuated timer rotates at a constant speed. For this reason, the discharging time period (which is equal to the serving time period of the batteries 5) is in the vicinity of about twenty seconds when the cycle of charge-discharge operation is low but becomes about ten seconds when the cycle of charge-discharge operation exceeds 40 as indicated at point C in FIG. 16. In order to avoid such a variation, the present value of the timer has to be corrected by trial and error or by experience. This is inconvenient particularly where the batteries are used for model planes which are usually required to be on flight for a predetermined time period.

In the embodiment of the invention shown in FIG. 15, however, the timer is driven from a motor 21 which is applied with a voltage of the source batteries 4, so that the speed of the motor 21 is reduced in accordance with the voltage drops of the source batteries 4. As a result, the discharging time of the charged batteries 5 becomes substantially uniform despite the voltage drops of the source batteries 4. However, the speed reduction of the timer motor under the influence of a voltage drop of the source batteries due to repeated charging operations does not necessarily correspond to a reduction in the charging current and therefore, unless a countermeasure is provided, it is difficult to maintain constant the amount of electricity to be charged without being influenced by the voltage drops of the source batteries from the first to the last minute of the service life of the source batteries. It can be attained, however, by connecting in series and/or parallel to the timer motor a non-linear resistor element 15 which has a resistance value varying automatically in response to variations in the voltage of the source batteries, thereby maintaining substantially constant the amount of electricity to be charged in each charging operation even at an increased frequency. Needless to say, as for the non-linear resistor element, there may be employed a pilot lamp, thermistor, varistor or the like.

It will be apparent that the non-linear resistor element such as the pilot lamp 15 is, even if inserted in series with the batteries 5, equivalent as far as the uniformity of the charging current is concerned.

In the embodiment under discussion, it is made possible to maintain constant the discharging time period of small-sized batteries which are charged by one charging operation even if the voltage of the source batteries should drop due to an increased charging frequency and thus to control correctly the flight time of a model plane or an operating time of other motor driven devices simply by presetting a predetermined value by means of the timer dial.

It will be understood from the foregoing description that, according to the present invention, the batteries to be charged are once discharged to a predetermined same level to effect uniform charging irrespective of the amounts of residual electricity in the individual batteries. The efforts required on the part of the operator or user during the charging operations are lessened to a considerable degree since the charging is effected automatically and charged batteries are ejected also automatically upon completion of the charging operation, without causing variations in the amount of electricity to be charged even when source batteries are exhausted. Furthermore, the charger of the present invention is capable of charging batteries of different charging currents without requiring additional adapting devices. It will also be appreciated that the provision of the compartment in the charger in one specific form of the invention can give a great convenience in storing charged batteries in a safe state.

Although this invention has been described in connection with its preferred embodiment, it will be apparent that the invention is not limited to the specific construction and operation shown but is susceptible to various changes and modifications without departing from the scope of the novel concepts of this invention as defined in the appended claims.

What is claimed is:

1. An automatic electric charger for charging small-sized batteries, which comprises: an inner power source battery capable of producing a higher voltage than the small-sized battery to be charged; a casing; at least one pocket in said casing for accomodating said battery to be charged; a timer; a motor driving said timer; a cam mechanism driven by said timer; graduated dial means for presetting said timer; a timing cycle circuit including said inner power source battery and said motor during which said inner power source battery drives said motor for a predetermined fixed total cycle period; a predischarging cycle circuit which is operative for a predetermined fixed time period of said timer upon actuation of said timer; and a charging cycle circuit which is operative for a predetermined variable time period of said timer upon termination of said discharging time period for effecting the charging operation on said battery said predetermined fixed total cycle period being at least equal to the combination of said discharging time period and said charging time period.

2. An electric charger as defined in claim 1 wherein said discharging and charging circuits are opened and closed by electric contacts operated by said cam mechanism.

3. An electric charger as defined in claim 1, wherein said charging circuit comprises a pilot lamp for stabilizing the charging current during the charging operation of said battery.

4. An electric charger as defined in claim 3, wherein said casing further comprises resilient means for retaining said battery compressed therewithin said pocket; a hook member provided on said casing for locking engagement with said lid and mechanically released from said locking engagement upon completion of said charging operation, said battery being ejected from the pocket by means of said resilient means as soon as said hook member is released from the locking engagement with said lid.

5. An electric charger as defined in claim 4, wherein said lid is provided with a first contact means and said pocket is provided with a second contact means, said first and second contact means completing an electric circuit when said battery is in said charging position and breaking said electric circuit when said battery is removed from said charging position.

6. An electric charger as defined in claim 1, wherein said casing comprises a negative terminal supported on a spring and formed in a recessed shape to preclude closing of said charging circuit when said battery is mounted in an inverted position.

7. An electric charger as defined in claim 1, wherein said casing comprises a normally closed jack contact connected in series to said inner power source, said jack contact being opened when a jack led from an external power source is inserted into said jack contact for connecting said external power source to said battery to be charged.

8. An electric charger as defined in claim 1, wherein said casing comprises a lid-protected auxiliary compartment for accomodating therein at least one small-sized spare battery.

9. An electric charger as defined in claim 8, wherein said auxiliary compartment comprises a coil spring and an angular leaf spring, said springs being respectively compressed and flexed when small-sized batteries are stored in said compartment, said small-sized batteries being automatically projected one after another from said compartment upon opening said lid thereof.

10. An electric charger as defined in claim 1, wherein said motor comprises a non-linear resistance element electrically connected thereto, the resistance value of said non-linear resistance element varying automatically in response to variations in voltage of said inner power source battery.

11. An automatic electric charger as in claim 1 for simultaneously charging a number of batteries of different charging currents, wherein said inner power source battery supplies a suitable current to a battery of the largest charging current, charging current correcting resistances connected in series to said inner power source battery for supplying different charging currents respectively to batteries of smaller charging currents, and a single detector coupled to each of the batteries through said current correcting resistances.

12. An electric charger as defined in claim 1 and wherein said cam mechanism includes first switch means for maintaining said timer energized throughout said fixed total cycle, second switch means for changing over to said charging cycle circuit upon termination of said discharging time period, and third switch means for opening said charging cycle circuit upon termination of said charging time period.

13. An automatic electric charger for charging small-sized batteries, which comprises: an inner power source capable of producing a higher voltage than the small-sized battery to be charged; a casing; at least one pocket in said casing for accomodating said battery to be charged; a timer; a cam mechanism driven by said timer; graduated dial means for presetting said timer; a timing cycle circuit including said inner power source and said timer which is operative for a predetermined fixed total cycle period of said timer; a predischarging cycle circuit which is operative for a predetermined fixed time period of said timer upon actuation of said timer; and a charging cycle circuit which is operative for a predetermined variable time period of said timer upon termination of said discharging time period for effecting the charging operation on said battery said predetermined fixed total cycle being at least equal to the combination of said dicharging time period and said charging time period and, wherein said casing includes a lid for covering said pocket, and means operatively connecting said lid to said timer for the automatic ejection of the charged battery from said pocket upon termination of the charging cycle and upon automatic opening thereof.

14. An electric charger as defined in claim 13, wherein said lid has a flat elongated metal plate connector thereon for engagement with the positive terminal of the battery to be charged for completing an electric circuit.

* * * * *